United States Patent [19]

Fargo

[11] Patent Number: 5,804,779
[45] Date of Patent: Sep. 8, 1998

[54] METHOD FOR GENERATING AND SCALING VELOCITY PROFILES FOR ELEVATOR CAR DOORS

[75] Inventor: Richard N. Fargo, Plainville, Conn.

[73] Assignee: Otis Elevator Company, Farmington, Conn.

[21] Appl. No.: 754,457

[22] Filed: Nov. 21, 1996

[51] Int. Cl.$^6$ ...................................................... B66B 13/14
[52] U.S. Cl. ........................... 187/316; 187/293; 187/295
[58] Field of Search .................................... 187/316, 293; 318/265, 257, 268

[56] References Cited

U.S. PATENT DOCUMENTS

| | | | |
|---|---|---|---|
| 4,342,379 | 8/1982 | Games et al. | 187/316 |
| 4,776,433 | 10/1988 | Langree et al. | 187/316 |
| 5,378,861 | 1/1995 | Barten et al. | 187/316 |

*Primary Examiner*—Robert Nappi

[57] ABSTRACT

A method for scaling a position versus time profile for elevator car doors includes a step for generating a time scaling factor and a distance scaling factor. The scaling factors allow a previously stored position versus time profile to be used for all subsequent operations of the elevator car doors.

10 Claims, 4 Drawing Sheets

METHOD FOR GENERATING AND SCALING VELOCITY PROFILES FOR ELEVATOR CAR DOORS

CROSS-REFERENCE TO RELATED APPLICATIONS

This application is related to a commonly owned co-pending application filed on the same day herewith having U.S. Ser. No. 08/754,456

TECHNICAL FIELD

The present invention relates to elevator car door systems and, more particularly, to the generation of velocity therefor.

BACKGROUND OF THE INVENTION

In elevator systems, elevator car doors are driven into opened and closed positions by an electric motor. The elevator car doors usually couple to hoistway doors to drive hoistway doors into open and closed positions. The elevator car doors typically have to maintain certain velocities at the beginning of an operation, in the middle of the operation, and at the end of the operation. For example, as the doors are opening, the initial velocity is relatively low to allow time for the elevator car doors to couple to the hoistway doors. After the two sets of doors are coupled, the doors accelerate to a higher velocity. The doors then decelerate toward the end of the opening operation to avoid slamming against a fixed stop.

A number of methods are used to achieve the change in velocity of the elevator car doors during various operations. A conventional approach to changing the velocity of elevator car doors is to use resistors. The resistors are placed in series with a voltage source and a DC motor and adjusted to provide smaller or greater values of resistance. The greater resistance value corresponds to slower DC motor operation and to smaller generated velocity output. The converse is true for the smaller resistance values. However, this approach has a number of limitations. First, resistors cannot compensate for changes in friction or other loading on the doors. Second, when resistors heat up, the resistance value changes and results in changes in the velocity of the elevator car doors. Such changes in velocity are highly undesirable because this does not provide a consistently smooth profile. Third, resistors are adjusted by a trial and error method, which is time consuming and frequently lacks necessary precision.

Another approach to varying the velocity of elevator car doors in modern closed loop systems includes software generated velocity profiles. The software dictates what the door velocity should be at a given time or distance. The velocity profiles are generated for each operation of the elevator car doors. This approach either results in a time lag for the doors to respond to a command or requires a powerful processor to generate profiles in real time.

Additionally, it is highly desirable to have smooth transitions from one velocity value to another. The transition from one velocity level to another is currently achieved by building in constant jerk (rate of change in acceleration divided by rate of change in time) segments and constant acceleration segments of the profile. The constant jerk segments, used to smooth the corners of the transition from constant velocity phase to constant acceleration phase of the doors, must match values of the velocity and acceleration where the constant jerk segments join the constant acceleration phase and the constant velocity phase. Matching the constant jerk segment with the constant acceleration phase and the constant velocity phase at numerous transition points takes a great deal of processor time.

Furthermore, a door control system cannot cause the doors to follow the high frequency components of the profile if these frequency components are higher than the bandwidth of the control system. This can cause misoperation of the elevator car doors, such as the doors overshooting the final position and hitting the stops or exciting resonant vibration frequency of the doors. The velocity profiles can be broken down to show the frequency content through a Fourier transform method. The profiles include low and high frequency components of velocity. Although the current method of providing constant jerk segments lowers the frequency content of the velocity profile by minimizing sharp corners, it is not known how much of the higher frequency content is attenuated and what is the frequency content of the profile. Aside from causing misoperation, the constant jerk method of generating a profile could result in very low frequency content and an associated increase in door operation time as compared to the optimum operation time.

DISCLOSURE OF THE INVENTION

It is an object of the present invention to improve the operation of elevator car doors by ensuring smooth opening and closing operations as the velocity of the doors changes during these operations.

It is another object of the present invention to reduce the processor time required for generating velocity profiles for elevator car door operations.

According to the present invention, a position versus time profile for each type of operation of elevator car doors is stored as part of an initialization procedure of the elevator car doors and then scaled so that for every subsequent operation of elevator car doors, the elevator car doors follow either the stored position versus time profile or a scaled version thereof. When the elevator car doors are either in a fully closed or fully opened position and must complete the entire opening or closing cycle, respectively, the elevator car doors follow the corresponding stored profile. When the doors do not start in fully opened or fully closed positions, such as during reversal, the position versus time profile is scaled so that a scaled version of the position versus time profile can be followed by the elevator car doors. As a door controller receives a command to move the elevator car doors, the door controller also receives information about the initial position of the elevator car doors and how much time it should take to complete the operation. The stored position versus time profile is scaled based on the initial position of the elevator car doors and the time during which the elevator car doors must complete the operation.

The present invention saves processor time because it uses stored profiles that are scaled rather than generating a profile in real time for every operation. The present invention also saves time and reduces the complexity of the software. Additionally, the present invention allows flexibility of tailoring each door operation for each specific floor without having to generate a new profile in real time and without sacrificing performance of the doors.

The foregoing and other advantages of the present invention become more apparent in light of the following detailed description of the exemplary embodiments thereof, as illustrated in the accompanying drawings.

BEST MODE FOR CARRYING OUT THE INVENTION

Figure 1:
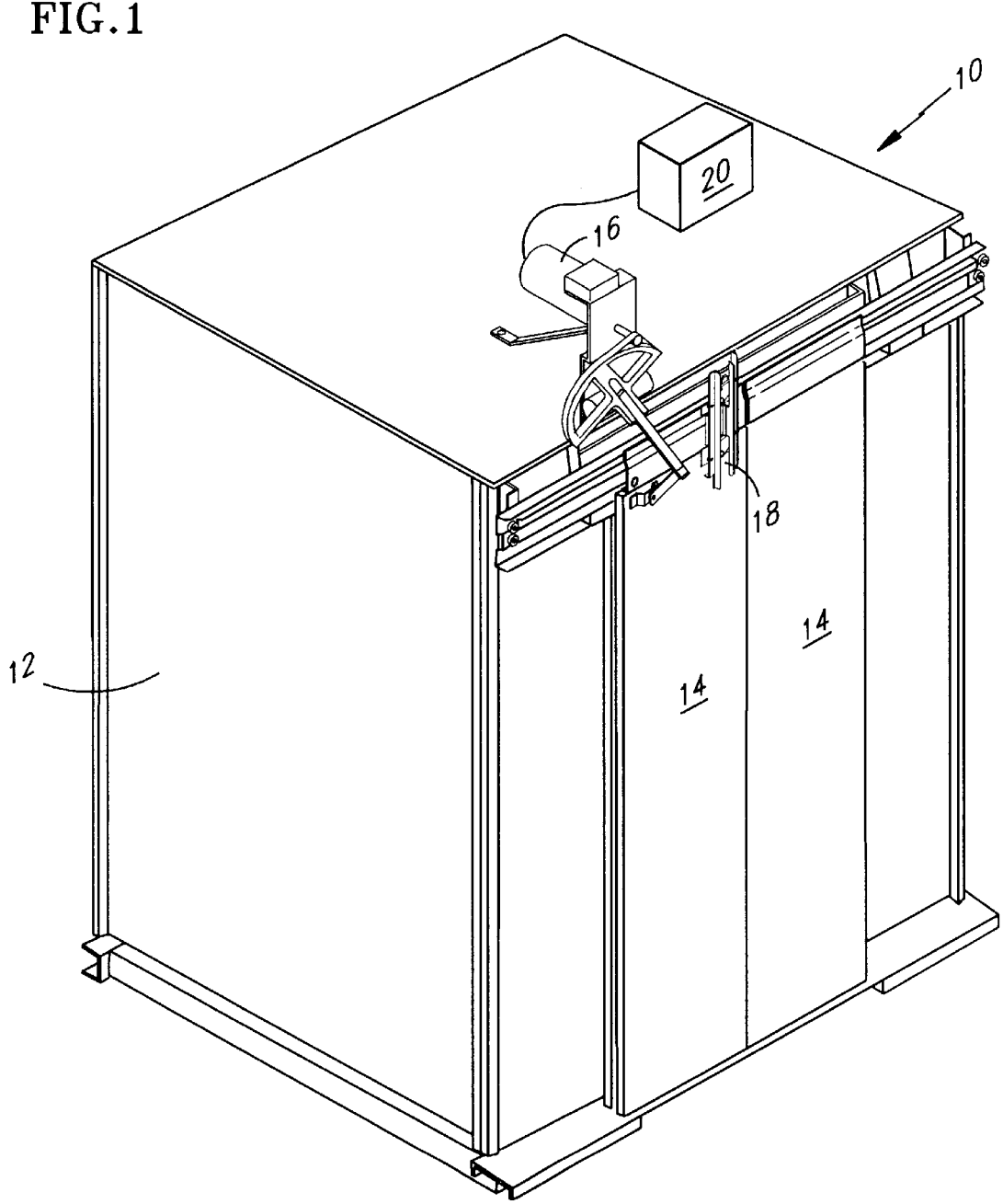
FIG. 1 is a schematic, perspective view of an elevator car with a door controller disposed on the top thereof.

Referring to FIG. 1, an elevator system 10 includes an elevator car 12 and elevator car doors 14 which are driven into open and closed positions by an electric motor 16. The elevator car doors 14 typically couple to hoistway doors (not shown) by means of a coupling device 18 and pull the hoistway doors into open and closed positions. A door controller 20 is disposed on top of the elevator car 12 and is in communication with the electric motor 16. The door controller 20 also receives input from a door positioning system (not shown) and commands to move the elevator car doors 14.

Figure 2:
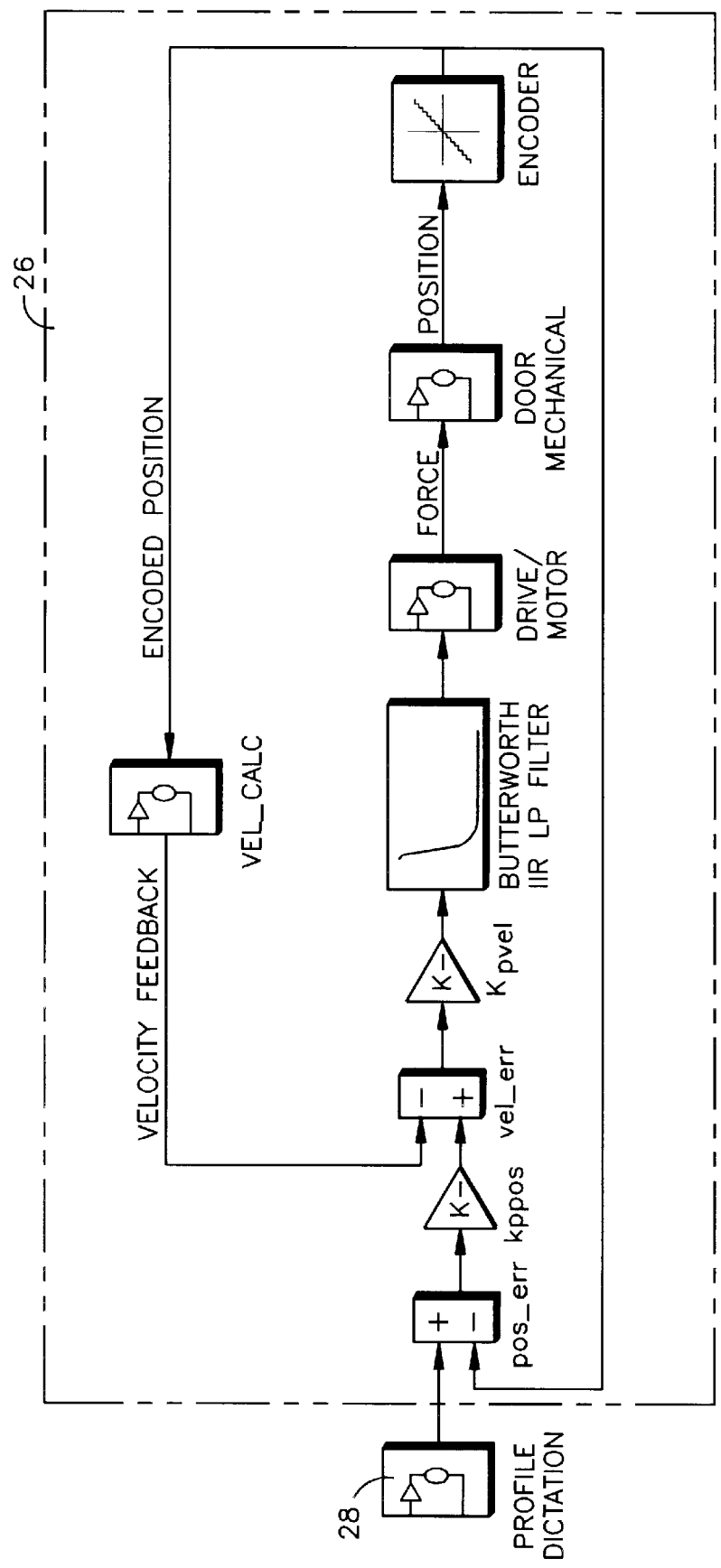
FIG. 2 is a schematic representation of a control system embedded in the software of the door controller of FIG. 1.

Referring to FIG. 2, a closed loop feedback control system 26 governs movement of the elevator car doors 14. The closed loop feedback control system is embedded in the software of the door controller 20. The control system 26 includes position reference 28, $X_{ref}$, as an input into the control system 26.

Figure 3:
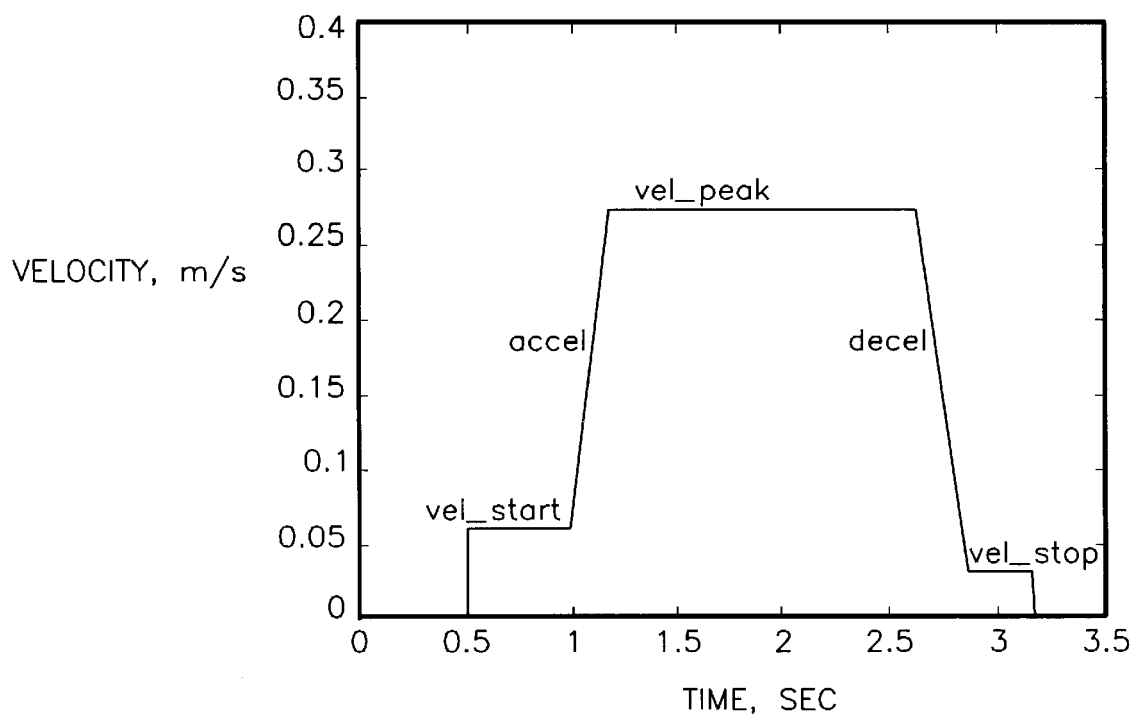
FIG. 3 is a plot of a straight line velocity versus time profile for a closing operation of elevator car doors of the elevator car of FIG. 1.

Referring to FIG. 3, a straight line velocity versus time profile is generated in the software of the door controller 20 as the elevator car door system is powered. The straight line velocity versus time profile represents the desired velocity values at certain times of the door operating function. For example, at the beginning of an opening door function, velocity values are relatively low to allow the hoistway doors to couple to the elevator car doors. Once the coupling is completed, the doors accelerate to a higher velocity value, shown in FIG. 3 as a velocity peak. The higher velocity value is maintained until the doors decelerate to a stop velocity. The lower velocity value is frequently necessary toward the end of a door operation to either decelerate the elevator car doors, or in the case of a closing operation to allow the hoistway doors to decouple from the elevator car doors.

The straight line profiles are typically generated for each door function, such as opening, closing, reversing, or for different speeds required at various floors. The parameters that determine the shape of the straight line velocity versus time profile can change. Such parameter changes require recalculation of a new straight line velocity versus time profile.

Figure 4:
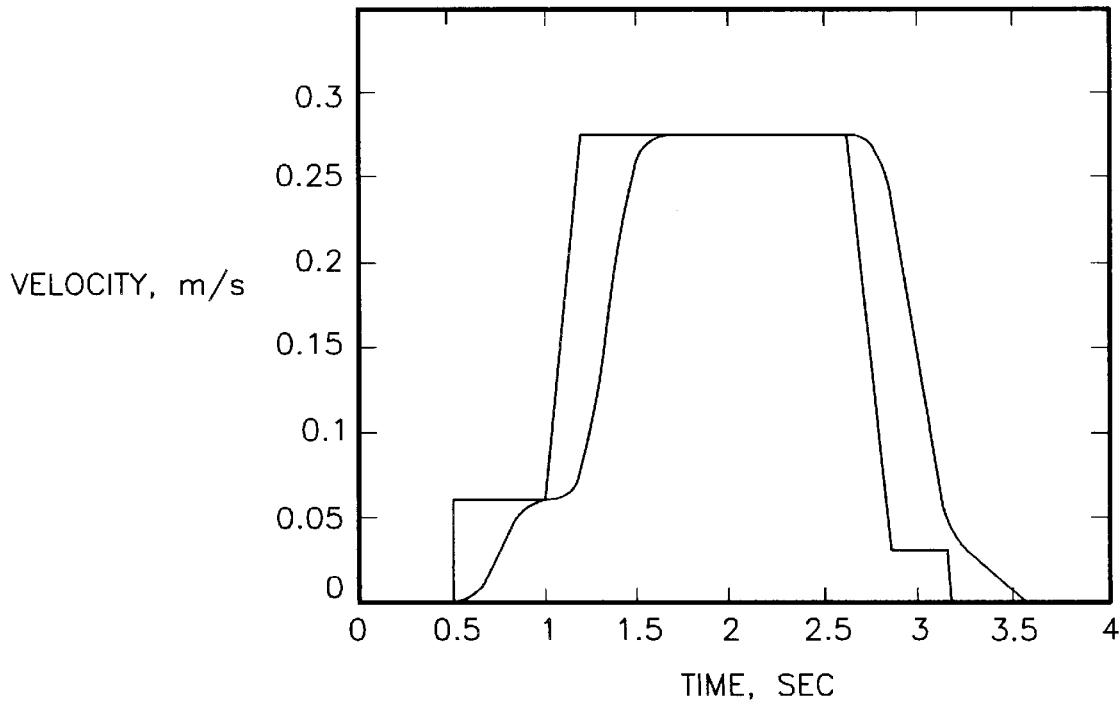
FIG. 4 is a plot of the straight line velocity versus time profile of FIG. 3 and of a filtered velocity versus time profile.

Referring to FIG. 4, the straight line velocity versus time profile is passed through a low pass finite impulse response (FIR) filter. The low pass filter attenuates high frequencies and ensures that the frequency content of the profile matches the bandwidth of a position feedback control system. In the preferred embodiment of the present invention, the control system 26 has a one to two Hertz (1 to 2 Hz) position control bandwidth. The finite impulse response filter calculates the moving weighted average rounding the corners of the straight line velocity versus time profile to ensure smooth transitions between different velocity values.

Although the best mode embodiment describes the use of a low pass finite impulse response filter, a low pass infinite impulse response (IIR) filter could be used also.

Figure 5:
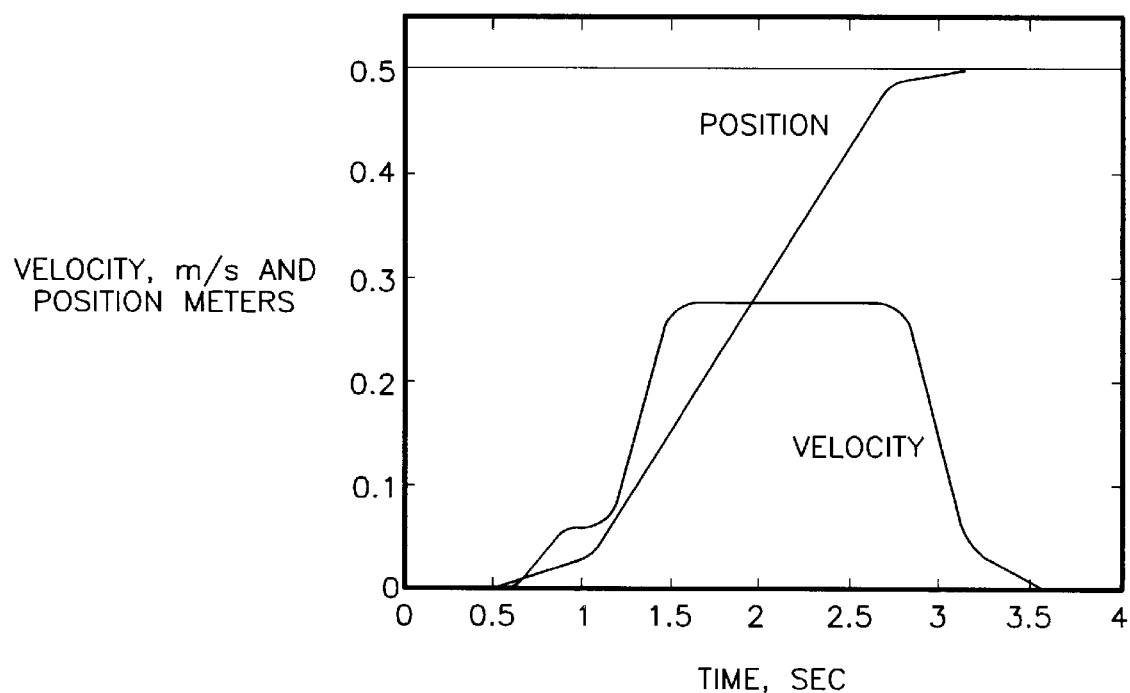
FIG. 5 is a plot of the filtered velocity versus time profile of FIG. 4 and an integrated position versus time profile that is scaled for subsequent door operations, according to the present invention.

Referring to FIG. 5, the filtered velocity versus time profile is integrated to obtain a position versus time profile. Thus, for each point on a filtered velocity versus time profile another point is calculated and plotted as a point on the position versus time profile. The position versus time profile is generated in the preferred embodiment because the closed loop control system 26 is a position control system.

The position versus time profile for each type of elevator car door operation is then stored in the RAM of the door controller 20.

When the door controller receives a door command to move the doors, a distance scaling factor, $K_{dist}$, and a time scaling factor, $K_{time}$, are determined according to the following:

$$K_{dist} = \frac{(X_{final} - X_{initial})}{X_{total\,profile}},$$

wherein $X_{final}$ is the final targeted position of the doors; $X_{initial}$ is the position of the doors at the time the command to move the doors is received; and $X_{total\,profile}$ is the total distance of the stored position versus time profile for the particular operation; and $$K_{time} = \frac{t_{total}}{t_{desired}},$$

wherein $t_{total}$ is the total time of the stored position versus time profile for the particular operation and is constant for that particular operation; and $t_{desired}$ is the desired time within which the door operation must be completed and is determined according to:

$$t_{desired} = t_{stored} \times \sqrt{K_{dist}}$$

wherein $t_{stored}$ is normal time for the full operation and can be adjusted to meet the customers needs and can vary from one floor to another. Therefore, the stored profile can be scaled for each floor individually without having to generate new profiles.

The position of the doors at the time of the command to move the doors, $X_{initial}$, is obtained from the positioning system providing input into the door controller 20 as to the position of the doors at the time the command to move the doors is received. The final position of the doors, $X_{final}$, is the final targeted position of the doors at the completion of the command. The total distance of the stored position versus time profile, $X_{total}$, is the total distance of the stored profile to be scaled and is a known parameter.

Once the scaling factors have been determined, the stored position versus time profile for the appropriate door operation is retrieved and is scaled in the software according to the following:

$$X_{ref} = X_{initial} + X(t_n) \times K_{dist},$$

wherein the $X_{ref}$ is position reference 28 and serves as an input into the position control system 26 of what the desired position of the doors is; $X_{initial}$ is the position of the doors at the time the command to move the doors is received; $X(t_n)$ is a position of the doors on the stored position versus time profile at a specific time, $t_n$; and $K_{dist}$ is the distance scaling factor.

The time, $t_n$, for the position of the doors from the stored profile, $X(t_n)$, is determined according to the following:

$$t_n = t_{n-1} + \Delta t \times K_{time},$$

wherein tn is the time for which the reference position, $X(t_n)$, is taken from the position versus time profile; $t_{n-1}$ is the time for a previous iteration; $\Delta t$ is the real time difference between the $t_n$ and $t_{n-1}$, in the preferred embodiment set for five millisecond (5 msec); $K_{time}$ is the time scaling factor.

In operation, when the elevator car door operating system is initially powered, a straight line velocity versus time profile is generated as part of the initialization procedure. The velocity versus time profile is then passed through the low pass FIR filter. The filtered velocity versus time profile is then integrated into the position versus time profile. The profile is then stored for future use. When the door controller 20 receives a command to move elevator car doors, the controller retrieves the stored position versus time profile for the appropriate operation. The door controller does not need to generate a profile for every command and take up valuable processor time. The door controller generates the scaling factors and scales the appropriate profile based on the initial position of the doors and the time during which the operations must be completed.

In the event that the doors are either fully opened or fully closed and must be moved based upon a command into a fully closed or fully opened position, respectively, each scaling factor equals one (1) and the software steps through the stored position versus time profile. However, in the event that doors do not need to follow the complete closing or opening cycle or if the desired time, $t_{desired}$, for completing the operation differs from the total time, $t_{total}$, associated with the profile, the corresponding stored position versus time profile is scaled according to the above description. For example, if the doors are closing and at some intermediate point of the closing operation receive an opening command, the doors must travel only a portion of the total opening distance and must complete the task in a fraction of time. Therefore, the stored position versus time profile will be scaled and tailored for each deviant door operation.

The present invention saves processor time because it uses stored profiles that are scaled rather than generating a profile in real time for every operation. The present invention also saves time and reduces the complexity of the software. Additionally, the present invention allows flexibility of tailoring each door operation for each specific floor without having to generate a new profile in real time and without sacrificing performance of the doors.

While the present invention has been illustrated and described with respect to a particular embodiment thereof, it should be appreciated by those of ordinary skill in the art, that various modifications to this invention may be made without departing from the spirit and scope of the present invention. For example, although the preferred embodiment of the present invention describes a method for scaling a position versus time profile, a velocity versus time profile can be scaled and used as an input into a velocity control system. Also, the preferred embodiment describes the position versus time profile that was previously filtered to attenuate high frequency, an unfiltered profile can be scaled in accordance with the teaching of the present invention.

I claim:

1. A method for controlling motion of elevator car doors, said method comprising steps of:

generating a straight line velocity versus time profile for desired door movement;

passing said straight line velocity versus time profile through a low pass filter to obtain a filtered velocity versus time profile for limiting frequency content of said velocity versus time profile;

integrating said filtered velocity versus time profile to obtain a position versus time profile;

storing said position versus time profile;

retrieving said position versus time profile after receiving a command to move said elevator car doors; and scaling said position versus time profile based on the initial position of said elevator car doors and based on the time desired to complete the operation.

2. The method according to claim 1 wherein said low pass filter is a low pass finite impulse response filter.

3. The method according to claim 1 wherein said low pass filter is a low pass infinite impulse response filter.

4. The method according to claim 1 wherein said position versus time profile being stored in RAM.

5. A method for controlling motion of elevator car doors, said method comprising steps of:

generating a velocity versus time profile for desired door movement; and scaling said velocity versus time profile based on the initial position of said elevator car the doors and based on the time desired to complete the operation.

6. A method for scaling a position versus time profile for moving elevator car doors, said method comprising steps of:

determining a distance scaling factor according to the following:

$$K_{dist} = \frac{(X_{final} - X_{initial})}{X_{total\,profile}},$$

wherein $X_{final}$ is the final targeted position of the doors, $X_{initial}$ is the position of the doors at the time the command to move the doors is received, and $X_{total\,profile}$ is the total distance of the stored position versus time profile for the particular operation;

determining a time scaling factor according to the following:

$$K_{time} = \frac{t_{total}}{t_{desired}},$$

wherein $t_{desired}$ is the desired time within which the door operation must be completed, and $t_{total}$ is the total time of the stored position versus time profile for the particular operation; and determining a position reference point to serve as an input to a closed loop feedback control system according to the following:

$$X_{ref} = X_{initial} + X(t_n) \times K_{dist},$$

and $$t_n = t_{n-1} + \Delta t \times K_{time},$$

wherein the $X_{ref}$ is position reference and serves as an input into the position control system of what the desired position of the doors is, $X_{initial}$ is the position of the doors at the time the command to move the doors is received, $X(t_n)$ is a position of the doors on the stored position versus time profile at a specific time, $t_n$, $K_{dist}$ is the distance scaling factor, $t_n$ is the time for which the reference position, $X(t_n)$, is taken from the position versus time profile, $t_{n-1}$ is the time for a previous iteration, $\Delta t$ is the real time difference between the $t_n$ and $t_{n-1}$, and $K_{time}$ is the time scaling factor.

7. The method according to claim 6 wherein said time difference, $\Delta t$, is set for five milliseconds (5 msec).

8. The method according to claim 7 wherein $$t_{desired} = t_{stored} \times \sqrt{K_{dist}}$$

wherein $t_{stored}$ being stored time for completing a full operation.

9. An elevator car door system for opening and closing an elevator car door, said elevator car door system comprising:
   a door controller having software for scaling a position versus time profile to accommodate deviant door operations, wherein:
   a distance scaling factor is determined according to the following:

$$K_{dist} = \frac{(X_{final} - X_{initial})}{X_{total\ profile}},$$

wherein $X_{final}$ is the final targeted position of the doors, $X_{initial}$ is the position of the doors at the time the command to move the doors is received, and $X_{total\ profile}$ is the total distance of the stored position versus time profile for the particular operation;
   a time scaling factor is determined according to the following:

$$K_{time} = \frac{t_{total}}{t_{desired}},$$

wherein $t_{desired}$ is the desired time within which the door operation must be completed, and $t_{total}$ is the total time of the stored position versus time profile for the particular operation; and
   a position reference point to serve as an input to a closed loop feedback control system is determined according to the following:

$$X_{ref} = X_{initial} + X(t_n) \times K_{dist},$$

and $$t_n = t_{n-1} + \Delta t \times K_{time},$$

wherein the $X_{ref}$ is position reference and serves as an input into the position control system of what the desired position of the doors is, $X_{initial}$ is the position of the doors at the time the command to move the doors is received, $X(t_n)$ is a position of the doors on the stored position versus time profile at a specific time, $t_n$, $K_{dist}$ is the distance scaling factor, $t_n$ is the time for which the reference position, $X(t_n)$, is taken from the position versus time profile, $t_{n-1}$ is the time for a previous iteration, $\Delta t$ is the real time difference between the $t_n$ and $t_{n-1}$, and $K_{time}$ is the time scaling factor.

10. The elevator car door system according to claim 9 wherein $$t_{desired} = t_{stored} \times \sqrt{K_{dist}}$$

wherein $t_{stored}$ being stored time for completing a full operation.

* * * * *